(12) United States Patent
Avila

(10) Patent No.: US 6,866,063 B2
(45) Date of Patent: Mar. 15, 2005

(54) LOW LEAK PRESSURE CONTROL ACTUATOR

(75) Inventor: Miguel I. Avila, Chihuahua (MX)

(73) Assignee: Delphi Technologies, Inc., Troy, MI (US)

(*) Notice: Subject to any disclaimer, the term of this patent is extended or adjusted under 35 U.S.C. 154(b) by 117 days.

(21) Appl. No.: 10/236,242

(22) Filed: Sep. 6, 2002

(65) Prior Publication Data

US 2004/0045611 A1 Mar. 11, 2004

(51) Int. Cl.[7] .................................................. F15B 13/044
(52) U.S. Cl. ............................... 137/596.17; 251/129.14
(58) Field of Search .................. 137/596.17; 251/129.14

(56) References Cited

U.S. PATENT DOCUMENTS

| | | | | |
|---|---|---|---|---|
| 4,998,559 A | * | 3/1991 | McAuliffe, Jr. | 137/596.17 |
| 5,104,091 A | * | 4/1992 | Rathay et al. | 137/596.17 |
| 5,282,329 A | * | 2/1994 | Teranishi | 137/596.17 |
| 5,606,992 A | * | 3/1997 | Erickson et al. | 137/596.17 |
| 5,651,391 A | * | 7/1997 | Connolly et al. | 137/596.17 |
| 5,950,984 A | * | 9/1999 | Anderson et al. | 137/596.17 |
| 6,217,001 B1 | | 4/2001 | Gluchowski et al. | |
| 6,308,725 B1 | | 10/2001 | Lawlyes et al. | |
| 6,328,065 B1 | * | 12/2001 | Schmid et al. | 137/596.17 |
| 6,345,606 B1 | | 2/2002 | Ricci-Ottati et al. | |
| 6,435,168 B1 | | 8/2002 | Bircann et al. | |
| 6,644,350 B1 | * | 11/2003 | Douglass et al. | 137/596.17 |

* cited by examiner

Primary Examiner—Gerald A. Michalsky
(74) Attorney, Agent, or Firm—Jimmy L. Funke

(57) ABSTRACT

A low leak pressure control actuator for, e.g., controlling pressure in an automatic transmission system, includes a poppet and a check ball slidably disposed within a housing. The poppet and check ball are movable between a de-energized configuration, plural partially energized configurations, and a fully energized configuration. In the de-energized configuration, the poppet and check ball prohibit all flow to and from the supply port and permit flow between the control port and the exhaust port. In the partially energized configurations, the poppet and check ball permit flow to and from all of the ports, and incremental changes in the internal displacement of the poppet produce incremental changes in a control pressure. In the fully energized configuration flow, the poppet and check ball prohibit all flow to the exhaust port and permit fluid flow between the supply port and the control port.

7 Claims, 3 Drawing Sheets

LOW LEAK PRESSURE CONTROL ACTUATOR

TECHNICAL FIELD

The present invention relates to motor vehicle sensors and actuators.

BACKGROUND OF THE INVENTION

Automobiles equipped with automatic transmissions have become ubiquitous. A conventional automatic transmission includes a planetary gearset, a set of bands used to engage parts of the gearset, a set of wet-plate clutches to engage other parts of the gears, a hydraulic system controlling the clutches and bands, and a transmission fluid pump. Numerous solenoid valves or actuators are used to control the flow of transmission fluid through the automatic transmission. The typical solenoid valves that are used in an automatic transmission include variable bleed solenoid (VBS) valves and variable flow solenoid (VFS) valves.

A VBS valve is a current-controlled, electro-hydraulic actuator that provides an outlet pressure that is a precise function of the current applied to the valve. A constant supply pressure is supplied to the valve through a fixed control orifice to a control chamber formed by the valve. The control chamber pressure can be controlled by allowing the control chamber to bleed to a reservoir through the variable orifice formed by the VBS valve. With this structure, a VBS valve can regulate fluid line pressure from a maximum value to a minimum value. However, fluid flow also ranges from a maximum value to a minimum value during operation of the VBS valve, which reduces efficiency of the transmission fluid pump.

VFS valves also regulate fluid line pressure from a maximum value to a minimum value, but they do so using a spool valve which minimizes fluid flow at both maximum and minimum pressure values. Unfortunately, VFS valves cannot effectively minimize fluid leakage through the valve while maximizing movement of the spool valve with spool movement being desirable for promoting good operation of the valve operation. In other words, when leakage is minimized the spool valve undesirably tends to stick, whereas when spool movement is maximized, undesirable leakage tends to increase.

The present invention has recognized these prior art drawbacks, and has provided the below-disclosed solutions to one or more of the prior art deficiencies.

SUMMARY OF THE INVENTION

A pressure control actuator includes a housing that forms a supply port, a control port, and an exhaust port. A valve seat insert is established within the housing. The control port is in fluid communication with the valve seat insert and the exhaust port and the supply port are formed on opposite sides of the valve seat insert. Moreover, a poppet and a check ball are slidably disposed within the housing. The poppet and the check ball are movable between a de-energized configuration, plural partially energized configurations, and a fully energized configuration. In the de-energized configuration flow is prohibited between the supply port and the control port, prohibited between the exhaust port and the supply port, and permitted between the control port and the exhaust port. In the plural partially energized configuration flow is permitted between the supply port and the control port, between the control port and the exhaust port, and between the exhaust port and the supply port. Further, in the partially energized configurations, incremental changes in the displacement of the poppet produce incremental changes in a control pressure. In the fully energized configuration flow is prohibited between the control port and the exhaust port and flow is permitted between the supply port and the control port.

In a preferred embodiment, the valve seat insert includes a central bore that is circumscribed by a poppet seat and a check ball seat. The poppet engages the poppet seat to block fluid blow between the exhaust port and the control port. The check ball engages the check ball seat to block fluid flow between the supply port and the control port and between the supply port and the exhaust port.

Preferably, the actuator further includes a frame and the housing extends from the frame. A coil is disposed within the frame and is energizable to move the actuator between the partially energized configurations and the fully energized configuration. Also, an armature is slidably disposed within the coil. The armature defines a proximal end and a distal end that engages the poppet. A collar surround the distal end of the armature. Moreover, in a preferred embodiment, a first diaphragm spring circumscribes the distal end of the armature adjacent to the collar and biases the actuator to the de-energized configuration. Preferably, a second diaphragm spring circumscribes the proximal end of the armature and helps bias the actuator to the de-energized configuration.

In a preferred embodiment, the housing defines a distal end and the check ball is disposed within the housing adjacent to the distal end. The actuator further includes a coil spring adjacent to the check ball. A spring retainer is installed within the housing adjacent to the spring such that the spring is between the check ball and the spring retainer. It can be appreciated that spring retainers of varying thicknesses may be installed in the distal end of the housing to calibrate the actuator.

In another aspect of the present invention, pressure control actuator includes a housing that forms a supply port, a control port, and an exhaust port. A poppet and a check ball are slidably disposed within the housing. The poppet and the check ball are movable between a de-energized configuration, plural partially energized configurations, and a fully energized configuration. In the de-energized configuration flow is prohibited between the supply port and the control port, prohibited between the exhaust port and the supply port, and permitted between the control port and the exhaust port. In the plural partially energized configuration flow is permitted between the supply port and the control port, between the control port and the exhaust port, and between the exhaust port and the supply port. Further, in the partially energized configurations, incremental changes in the displacement of the poppet produce incremental changes in a control pressure. In the fully energized configuration flow is prohibited between the control port and the exhaust port and flow is permitted between the supply port and the control port.

In yet another aspect of the present invention, a fluid control system includes a fluid supply, a hydraulically controlled device, and a fluid exhaust. A pressure control actuator is in fluid communication with the fluid supply, the hydraulically controlled device, and the fluid exhaust. The actuator is movable between a de-energized configuration, plural partially energized configurations, and a fully energized configuration. In the de-energized configuration, flow is prohibited between the fluid supply and the hydraulically controlled device, prohibited between the fluid supply and the fluid exhaust and permitted between the hydraulically controlled device and the fluid exhaust. In the plural partially energized configurations, flow is permitted between the fluid supply and the hydraulically controlled device, between the hydraulically controlled device and the fluid exhaust, and between the fluid supply and the fluid exhaust. Also, in the partially energized configurations, incremental changes in internal displacement of the actuator produce incremental changes in a control pressure. In the fully energized configuration, flow is prohibited between the hydraulically controlled device and the fluid exhaust and flow is permitted between the fluid supply and the hydraulically controlled device.

In still another aspect of the present invention, a pressure control actuator includes a housing that forms a supply port, a control port, and an exhaust port. A control means is disposed within the housing and is movable between a de-energized configuration, plural partially energized configurations, and a fully energized configuration. In the de-energized configuration flow is prohibited to and from the supply port and permitted between the control port and the exhaust port. In the partially energized configurations flow is permitted to and from the supply port, to and from the control port and to and from the exhaust port. Further, in the partially energized configurations, incremental changes in the displacement of the control means produce incremental changes in a control pressure. In the fully energized configuration flow is prohibited to and from the exhaust port and permitted between the supply port and the control port.

The present invention will now be described, by way of example, with reference to the accompanying drawings, in which:

DESCRIPTION OF AN EMBODIMENT OF THE INVENTION

Figure 1:
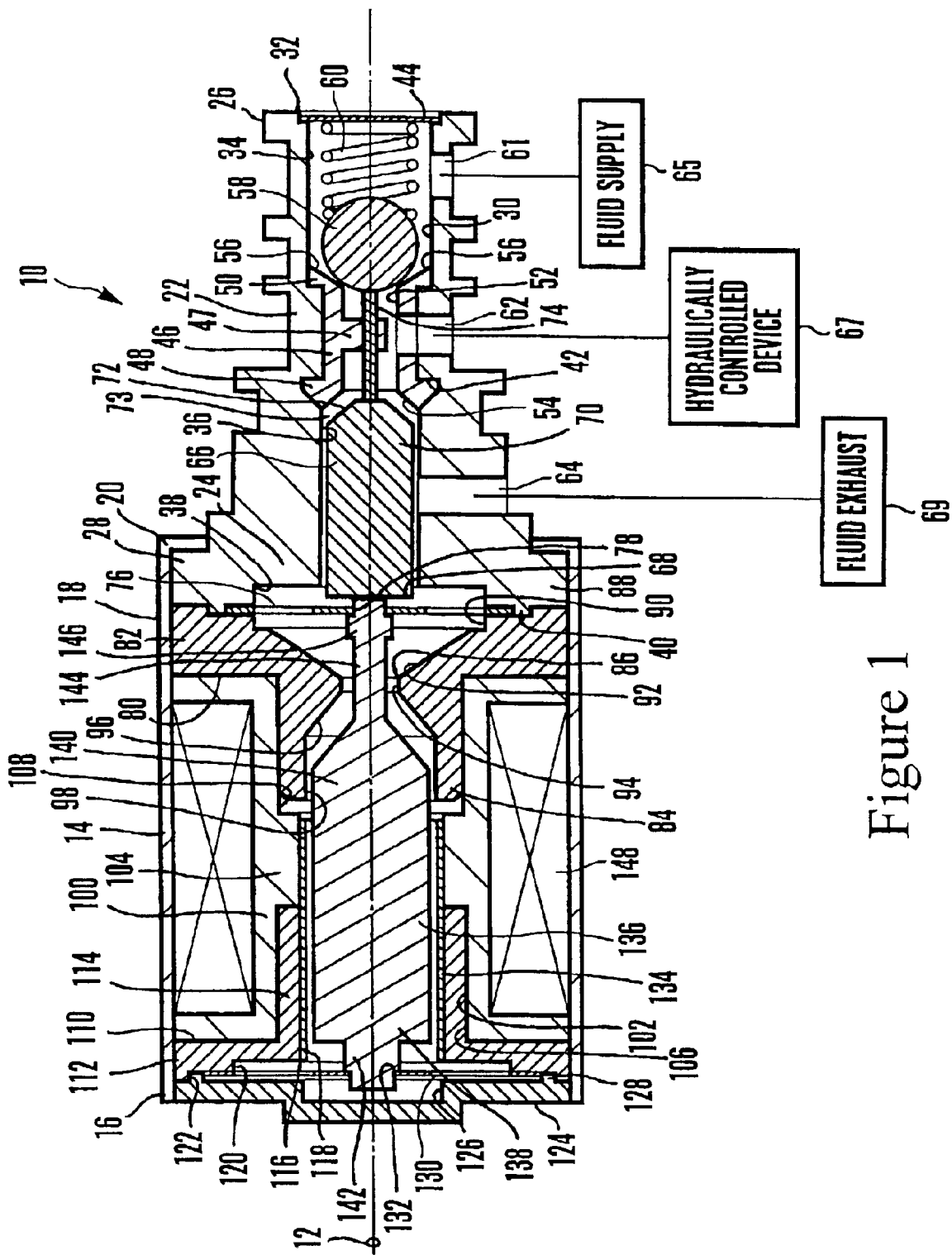
FIG. 1 is a cross-sectional plan view of a low leak pressure control actuator in a de-energized configuration.

Referring to the Figures, a low leak pressure control actuator is shown and generally designated 10. As shown, the actuator 10 defines a longitudinal axis 12 and includes a hollow, generally cylindrical frame 14 that defines an open proximal end 16 and an open distal end 18 that is circumscribed by an internal lip 20. The Figures show that the actuator 10 includes also includes a housing 22 that defines a proximal end 24 and a distal end 26. The proximal end 24 of the housing 22 is circumscribed by a flange 28 that has an external diameter approximately equal to the internal diameter of the frame 14. The housing 22 is disposed within the frame 14 such that the distal end 26 of the housing 22 protrudes through and extends beyond the distal end 18 of the frame 14. Also, the flange 28 of the housing 22 abuts the internal lip 20 of the frame 14.

Moreover, the Figures show that a generally cylindrical bore 30 can be formed through the housing 22 along the longitudinal axis 12. The bore 30 may include a relatively shallow, relatively large diameter first portion 32 that narrows to a relatively deep second portion 34. As shown, in a preferred non-limiting embodiment, the second portion 34 further narrows to a deeper third portion 36. The third portion 36 can expand to a relatively shallow, relatively large diameter fourth portion 38. The Figures also show that, if desired, a circular rib 40 having a diameter larger than the diameter of the fourth portion 38 of the bore 30 can extend axially from the proximal end 24 of the housing 22, i.e., adjacent to the flange 28, around the fourth portion 38 of the bore 30. Also, a radial notch 42 may be formed within the third portion 36 of the housing bore 30.

As shown in the Figures, a flat, disk-shaped spring retainer 44 is disposed within the first portion 32 of the housing bore 30 at the distal end 76 of the housing 22. It can be appreciated that the thickness of the spring retainer 44 can be varied in order to calibrate the actuator 10. Preferably, a valve seat insert 46 is installed in the end of the third portion 36 of the housing bore 30. The valve seat insert 46 can include a proximal flange 48 that engages the notch 42 formed in the bore 30 and a distal flange 50 that abuts the transition between the second portion 34 and third portion 36 of the housing bore 30. The Figures show that the valve seat insert 46 may be formed with a central bore 52 that is circumscribed proximally by a poppet seat 54 and distally with a check ball seat 56. In a preferred non-limiting embodiment, a support bearing 47 can extend from the inner wall of the central bore 52 to provide support and a bearing surface for a rod, described below, that slides therethrough.

Preferably, a check ball 58 is also slidably disposed within the housing 22 between the valve seat insert 46 and the spring retainer 44. Also, a preferably coil-shaped spring 60 can be installed in compression between the check ball 58 and the spring retainer 44. As described in detail below, when the actuator 10 is de-energized the spring 60 pushes the check ball 58 against the valve seat insert 46 so that it engages the check ball seat 56.

The Figures further show that in a preferred, non-limiting embodiment, a supply port 61 can be formed in the housing 22 leading to the housing bore 30, specifically the second portion 34 thereof. A control port 62 can extend through the housing 22 and the valve seat insert 46 to the valve seat insert bore 52. Also, an exhaust port 64 may lead to the housing bore 30, specifically the third portion 36 thereof. As shown, a fluid supply 65, e.g., a pump, can be connected to the supply port 61. Moreover, a hydraulically controlled device 67, e.g., a transmission, can be connected to the control port 62. An fluid exhaust 69, e.g., a reservoir, can be connected to the exhaust port 64.

As shown in the Figures, in a preferred embodiment, a solid, generally cylindrical poppet 66 is slidably disposed within the third portion 36 of the housing bore 30. Preferably, the diameter of the poppet 66 is smaller than the diameter of the third portion 36 of the bore 30 so that fluid can flow therearound. Moreover, the poppet 66 defines a proximal end 68 and a distal end 70. The distal end 70 of the poppet 66 can be circumscribed by a frusto-conical surface 72 that is sized and shaped to engage the poppet seat 54 when the actuator 10 is fully energized, as described in detail below. It is to be understood that a working hydraulic cavity 73 may be established between the distal end 70 of the poppet 66 and the valve insert 46. The Figures further show that in a preferred, non-limiting embodiment, a rod 74 extends from the distal end 70 of the poppet 66. As described in greater detail below, when the actuator 10 is energized the rod 74 pushes the check ball 58 away from the check ball seat 56.

As further shown in the Figures, a flat generally disk-shaped first diaphragm spring 76 can be installed adjacent to the proximal end of the housing 22 within the circular rib 40. Preferably, the first diaphragm spring 76 is formed with a central bore 78 that may be aligned with the longitudinal axis 12 of the actuator 10. A primary bobbin plate 80 can be disposed within the frame 14 adjacent to the proximal end 24 of the housing 22. As shown, the primary bobbin plate 80 can include a base 82 and a hub 84 that extends from the base 82 toward the middle of the frame 14. In a preferred, non-limiting embodiment, the primary bobbin plate 80 forms a central bore 86 along the axis 12. The central bore 86 of the primary bobbin plate 80 can include a generally cylindrical, relatively shallow, relatively large diameter first portion 88 that can narrow to a slightly deeper, generally cylindrical second portion 90. Moreover, the second portion 90 of the central bore 86 may extend to a first frusto-conical portion 92. Preferably, the first frusto-conical portion 92 narrows toward the middle of the primary bobbin plate 80 until it meets a relatively shallow, third cylindrical portion 94. A second frusto-conical portion 96 can extend outwardly from the third cylindrical portion 94 until it meets a relatively deep, fourth cylindrical portion 98 that terminates at the edge of the hub 84.

The Firures show that in a preferred, non-limiting embodiment, a generally "I" shaped bobbin 100 is also disposed within the frame 14. As shown, the bobbin 100 can be formed with a central bore 102. A flange 104 may extend inwardly from the wall of the bore 102 and divide the bore into a proximal portion 106 and a distal portion 108. Preferably, the distal portion 108 of the bobbin bore 102 fits around the primary plate hub 84. A secondary bobbin plate 110 is also shown and, in a preferred embodiment, includes a base 112 and a hub 114 that extends from the base 112. In a preferred embodiment, the hub 114 of the secondary bobbin plate 112 fits into the proximal portion 106 of the bobbin bore 102. Moreover, the secondary bobbin plate 110 is preferably formed with a generally cylindrical central bore 116 along the longitudinal axis 12. Starting with the hub 114, the central bore 116 of the secondary bobbin plate 110 preferably includes a relatively deep first portion 118 that widens to a relatively shallow second portion 120 that further widens to a relatively shallow third portion 122.

As shown in the Figures, an end cap 124 may be installed in the proximal end 16 of the frame 14 to enclose the proximal end 16 of the frame 14. The end cap 124 can include a central, generally cylindrical cavity 126 that preferably is surrounded by a circular rib 128. When the end cap 124 is installed in the proximal end 16 of the frame 14, the cavity 126 faces inwardly and the circular rib 128 fits into the third portion 122 of the central bore 116 of the secondary bobbin plate 110. In a preferred, non-limiting embodiment, a flat generally disk-shaped second diaphragm spring 130 is installed within the inner periphery of the end cap rib 128 between the end cap 124 and the base 112 of secondary bobbin plate 110. Preferably, the second diaphragm spring 130 is formed with a central bore 132 that can be aligned with the longitudinal axis.

Further shown in the Figures, an armature guide sleeve 134 can be disposed within the secondary bobbin plate hub 114 and the bobbin flange 104. Moreover, in a preferred, non-limiting embodiment, an armature 136 is slidably disposed within the armature guide sleeve 134 and the primary bobbin plate hub 84. The armature 136 defines a proximal end 138 and a distal end 140. Preferably, a proximal rod 142 extends from the proximal end 138 of the armature 136 and can engage the second diaphragm spring 130. Also, a distal rod 144 preferably extends from the distal end 140 of the armature 136. The distal rod 144 may extend through the bore 78 in the first diaphragm spring 76 so that it contacts the proximal end 68 of the poppet 66. The distal rod 144 may also include a collar 146 that contacts the face of the first diaphragm spring 76. The Figures also show that in a preferred, non-limiting embodiment, a generally toroidal coil 148 surrounds the bobbin 100. The coil 148 can be magnetically coupled to the armature 136 and when it is energized and de-energized it causes the actuator 10 to operate as described below. It is to be understood that the diaphragm springs 76, 130 work in concert to minimize frictional hysteresis within the actuator 10 during operation.

Operation

Initially, when the coil 148 is de-energized, as shown in FIG. 1, the actuator 10 is in a de-energized configuration, wherein the first diaphragm spring 76 and the second diaphragm spring 130 are relaxed, i.e., they are not deflected along the longitudinal axis 12. In this configuration, the poppet 66 is distanced a maximum distance from the poppet seat 54 to allow fluid flow from the control port 61 to the exhaust port 64. Moreover, the check ball 58 is seated against the check ball seat 56 by the coil spring 60 to block flow from the supply port 61 to the control port 62 and the exhaust port 64. In the de-energized configuration, the pressure on the control port 62 is zero.

Figure 2:
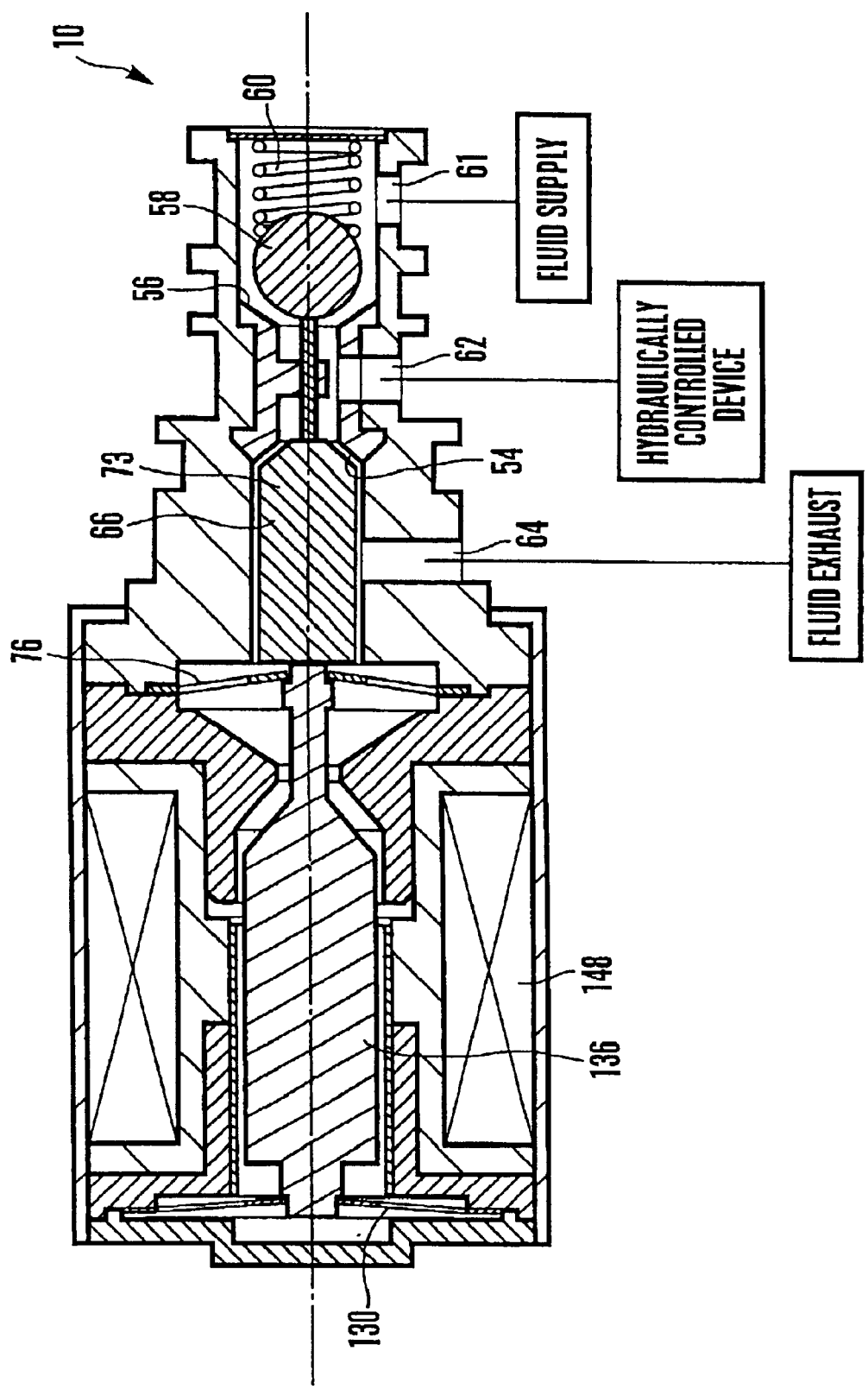
FIG. 2 is a cross-sectional plan view of the low leak pressure control actuator in a partially energized configuration.

When the actuator is in a partially energized configuration, shown in FIG. 2, the coil 148 is partially energized and the armature 136 moves to the right, looking down at FIG. 2, and this deflects the first and second diaphragm springs 76, 130. The armature 136 also moves the poppet 66 toward the poppet seat 54 such that the distance between the poppet 66 and the poppet seat 54 is decreased. The poppet 66 pushes the rod 74 which, in turn, pushes the check ball 58 to the right, looking at FIG. 2, compresses the coil spring 60, and unseats the check ball 58 from the check ball seat 56 so that fluid flow is permitted between the supply port 61 and the control port 62. In the partially energized configuration, fluid flow is also permitted between the control port 62 and the exhaust port 64.

As the current applied to the actuator 10 increases toward a maximum value the armature 136 continues to move to the right which, in turn, continues to move the poppet 66 toward the poppet seat 54 and thus, decreases the volume of the working hydraulic cavity 73. This movement produces an incremental increase on the control pressure proportional to the movement of the armature 136 and the poppet 66. It is to be understood that, theoretically, there are an infinite number of partially energized configurations for the actuator 10 between the de-energized configuration and the fully energized configuration, described below.

Figure 3:
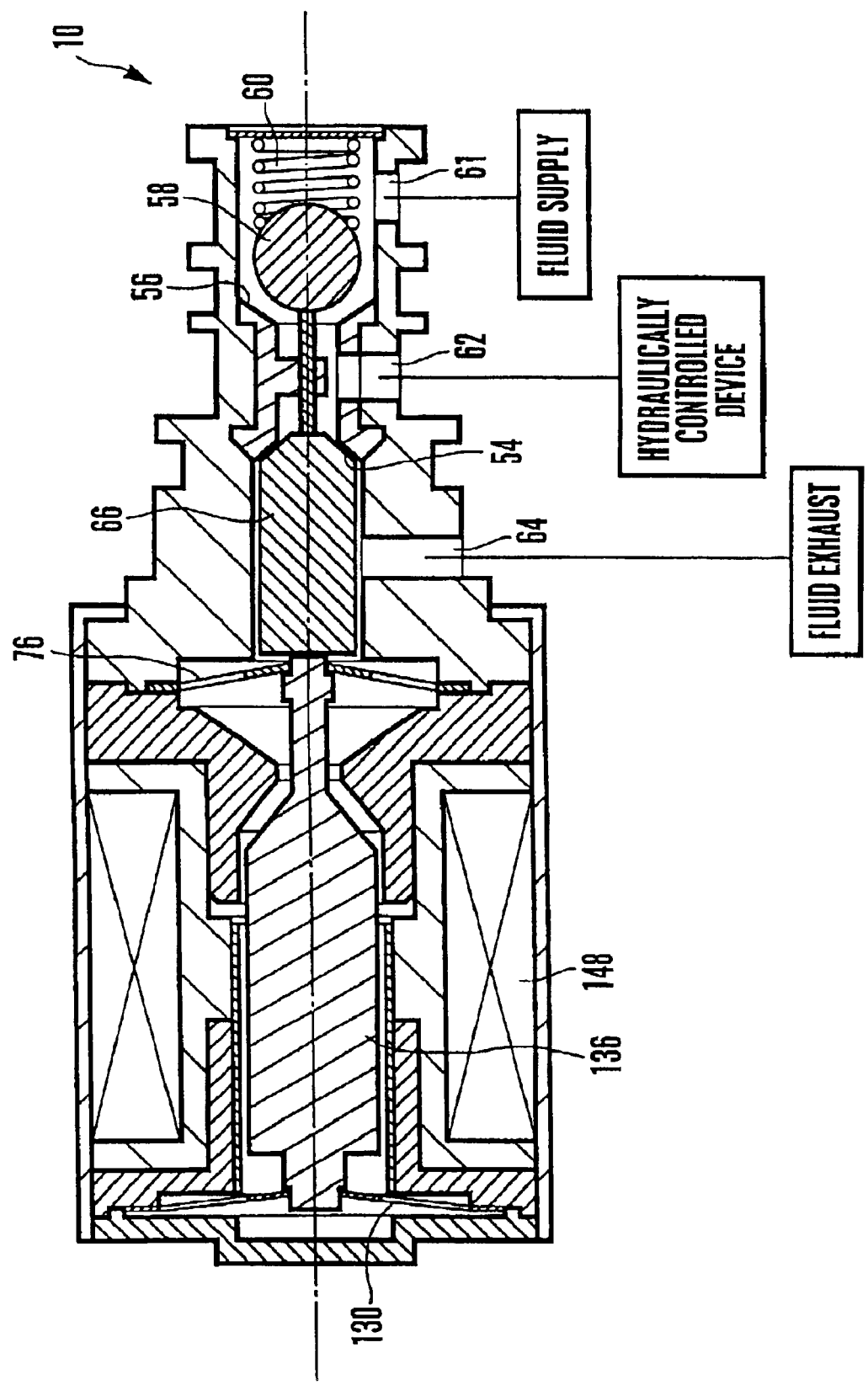
FIG. 3 is a cross-sectional plan view of the low leak pressure control actuator in a fully energized configuration.

When the actuator 10 is in the fully energized configuration, shown in FIG. 3, the current applied to the coil 148 has reached a maximum value. In this configuration, the armature 136 reaches its maximum displacement, as shown in FIG. 3, wherein the poppet 66 engages the poppet seat 54 to block fluid flow between the supply port 61 and the exhaust port 64 and fluid flow between the control port 62 and the exhaust port 64. In this configuration, the fluid flow between the supply port 61 and the control port 62 is maximized and fluid flow to the exhaust port 64 is minimized.

As the current applied to the actuator 10 decreases, the diaphragm springs 76, 130 and the coil spring 60 move the check ball 58, the poppet 66, and the armature 136 to the left, looking at the Figures. When the actuator 10 is de-energized, the actuator returns to the configuration shown in FIG. 1.

With the configuration of structure described above, it is to be appreciated that the configuration of structure of the low leak pressure control valve minimizes fluid leakage at maximum and minimum control pressures. Moreover, the configuration of the actuator minimizes the likelihood of the armature or poppet sticking during operation of the actuator and causing it to fail.

While the particular LOW LEAK PRESSURE CONTROL ACTUATOR as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

I claim:

1. A pressure control actuator, comprising:

a housing forming a supply port, a control port, and an exhaust port;

a valve seat insert established within the housing, the control port being in fluid communication with the valve seat insert and at least partially formed thereby, the exhaust port and the supply port being formed on opposite sides of the valve seat insert from each other, the valve seat insert also defining a rod bearing configured to closely surround a poppet rod to provide radial bearing therefor, the valve seat insert further defining a poppet seat and a ball seat;

a poppet slidably disposed within the housing, the poppet being coaxially co-extensive with a rod, the rod being closely received within the rod bearing;

a check ball slidably disposed within the housing, the poppet and the check ball being movable between a de-energized configuration wherein flow is prohibited between the supply port and the control port, prohibited between the exhaust port and the supply port, and permitted between the control port and the exhaust port, plural partially energized configurations wherein flow is permitted between the supply port and the control port, between the control port and the exhaust port, and between the exhaust port and the supply port, wherein incremental changes in the displacement of the poppet produce incremental changes in a control pressure, and a fully energized configuration wherein flow is prohibited between the control port and the exhaust port and flow is permitted between the supply port and the control port, wherein the valve seat insert includes a central bore that is circumscribed by the poppet seat and the check ball seat, the poppet engaging the poppet seat to block fluid blow between the exhaust port and the control port, the check ball engaging the check ball seat to block fluid flow between the supply port and the control port and between the supply port and the exhaust port;

a frame, the housing extending from the frame;

a coil within the frame, the coil being energizable to move the actuator between the partially energized configurations and the fully energized configuration;

an armature slidably disposed within the coil, the armature defining a proximal end and a distal end, the distal end of the armature engaging the poppet;

a collar surrounding the distal end of the armature; and a first diaphragm spring circumscribing the distal end of the armature adjacent to the collar, the first diaphragm spring biasing the actuator to the de-energized configuration.

2. The actuator of claim 1, further comprising:

a second diaphragm spring circumscribing the proximal end of the armature, the second diaphragm spring biasing the actuator to the de-energized configuration.

3. The actuator of claim 2, wherein the housing defines a distal end and the check ball is disposed within the housing adjacent to the distal end and the actuator further comprises:

a coil spring adjacent to the check ball; and a spring retainer adjacent to the spring such that the spring is between the check ball and the spring retainer.

4. The actuator of claim 3, wherein spring retainers of varying thicknesses may be installed in the distal end of the housing to calibrate the actuator.

5. A pressure control actuator, comprising:

a housing forming a supply port, a control port, and an exhaust port; a poppet slidably disposed within the housing;

a check ball slidably disposed within the housing, the poppet and the check ball being movable between a de-energized configuration wherein flow is prohibited between the supply port and the control port, prohibited between the supply port and the exhaust port, and permitted between the control port and the exhaust port, plural partially energized configurations wherein flow is permitted between the supply port and the control port, between the control port and the exhaust port, and between the supply port and the exhaust port, wherein incremental changes in the displacement of the poppet produce incremental changes in a control pressure, and a fully energized configuration wherein flow is prohibited between the control port and the exhaust port and flow is permitted between the supply port and the control port;

a frame, the housing extending from the frame;

a coil within the frame, the coil being energizable to move the actuator between the partially energized configurations and the fully energized configuration;

an armature slidably disposed within the coil, the armature defining a proximal end and a distal end, the distal end of the armature engaging the poppet;

a collar surrounding the distal end of the armature;

a first diaphragm spring circumscribing the distal end of the armature adjacent to the collar, the first diaphragm spring biasing the actuator to the de-energized configuration;

a second diaphragm spring circumscribing the proximal end of the armature, the second diaphragm spring biasing the actuator to the de-energized configuration a valve seat insert established within the housing, the control port being in fluid communication with the valve seat insert and at least partially formed thereby, the exhaust port and the supply port being formed on opposite sides of the valve seat insert from each other, the valve seat insert also defining a rod bearing configured to closely surround a poppet rod to provide radial bearing therefor, the valve seat insert further defining a poppet seat and a bail seat.

6. The actuator of claim 5, wherein the housing defines a distal end and the check ball is disposed within the housing adjacent to the distal end and the actuator further comprises:

a coil spring adjacent to the check ball; and a spring retainer adjacent to the spring such that the spring is between the check ball and the spring retainer.

7. The actuator of claim 6, wherein spring retainers of varying thicknesses may be installed in the distal end of the housing to calibrate the actuator.

* * * * *